(12) United States Patent
Guo et al.

(10) Patent No.: US 7,657,684 B2
(45) Date of Patent: Feb. 2, 2010

(54) USB INTERRUPT ENDPOINT SHARING

(75) Inventors: Hongshi Guo, San Diego, CA (US);
Uppinder Singh Babbar, San Diego, CA (US); Jeffrey Alan Dyck, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 11/677,845

(22) Filed: Feb. 22, 2007

(65) Prior Publication Data
US 2007/0255877 A1   Nov. 1, 2007

Related U.S. Application Data

(60) Provisional application No. 60/811,526, filed on Jun. 6, 2006, provisional application No. 60/795,773, filed on Apr. 28, 2006.

(51) Int. Cl.
*G06F 13/24* (2006.01)
(52) U.S. Cl. ...................................................... 710/268
(58) Field of Classification Search ................ 710/266, 710/268
See application file for complete search history.

(56) References Cited

U.S. PATENT DOCUMENTS

| | | | | |
|---|---|---|---|---|
| 5,848,279 | A * | 12/1998 | Wu et al. ..................... | 710/268 |
| 6,421,751 | B1 * | 7/2002 | Gulick ........................ | 710/107 |
| 6,862,643 | B2 * | 3/2005 | Wu et al. .................... | 710/302 |
| 7,073,010 | B2 * | 7/2006 | Chen et al. .................. | 710/313 |
| 7,222,201 | B2 | 5/2007 | Augustin et al. | |
| 2001/0027500 | A1 * | 10/2001 | Matsunaga .................. | 710/104 |
| 2002/0152348 | A1 * | 10/2002 | Scales et al. ................ | 710/313 |
| 2006/0212607 | A1 * | 9/2006 | Riethmuller ................. | 710/6 |

FOREIGN PATENT DOCUMENTS

| GB | 2422930 A | * | 8/2006 |
|---|---|---|---|
| JP | 2005352648 A | * | 12/2005 |
| WO | 0018159 | | 3/2000 |

OTHER PUBLICATIONS

International Search Report, PCT/US07/067555—International Search Authority—European Patent Office, Dec. 17, 2007.
Written Opinion, PCT/US07/067555—International Search Authority—European Patent Office, Dec. 17, 2007.

* cited by examiner

*Primary Examiner*—Paul R Myers
(74) *Attorney, Agent, or Firm*—Jiayu Xu

(57) ABSTRACT

A single USB interrupt endpoint is usable by two different active logical devices in a USB device. If a first logical device is to interrupt a USB host, then the first logical device writes a notification into the endpoint. The notification carries a number that identifies a first device object. If, however, a second logical device is to interrupt the host, then the second logical device writes a notification into the endpoint, but the notification carries a number that identifies a second device object. The USB host reads the notification. In one example, if the number and a Device ID indicate that the notification is for the first object, then the first object processes the notification. If the number and Device ID indicate that the notification is for the second object, then the first object notifies the second object so that the second object processes the notification.

21 Claims, 6 Drawing Sheets

REQUEST AND RECEIVE
DEVICE ID

| DEVICE OBJECT | INTERFACE NUMBER | DEVICE ID |
|---|---|---|
| OBJECT 1 (USB FUNCTION 1) | 1 (OWNS INTERRUPT ENDPOINT) | A |
| OBJECT 2 (USB FUNCTION 2) | 3 | A |
| OBJECT 3 (USB FUNCTION 3) | 4 | A |
| OBJECT 4 (USB FUNCTION 1) | 1 (OWNS INTERRUPT ENDPOINT) | B |
| OBJECT 5 (USB FUNCTION 2) | 3 | B |

CROSS-REFERNECE MAPPING TABLE

RECEIVE NOTIFICATION

NOTIFY SECOND DEVICE OBJECT IF NOTIFICATION HAS AN INTERFACE NUMBER AND DEVICE ID ASSOCIATED WITH THE SECOND DEVICE OBJECT

HOST FUNCTIONALITY

DEVICE FUNCTIONALITY

USB INTERRUPT ENDPOINT SHARING

CROSS-REFERENCE TO RELATED APPLICATION

This application claims the benefit under 35 U.S.C. § 119 of Provisional Application Ser. No. 60/795,773, filed Apr. 28, 2006, and of Provisional Application Ser. No. 60/811,526, filed Jun. 6, 2006. The entire content of both of these provisional applications is incorporated herein by reference.

BACKGROUND INFORMATION

1. Technical Field

The disclosed embodiments relate to the Universal Serial Bus (USB).

2. Background Information

A serial bus known as the Universal Serial Bus, or USB bus, is commonly used to connect devices to a computer. A device functions as a slave on the USB bus. The device includes pullup resistors for pulling up on the pair of data conductors in the USB bus cable. The computer is called the host. The host functions as the master on the USB bus. When the device is first coupled to the computer via the USB cable, the pullup resistors of the device pull up on the data conductors in the cable. The host detects this and responds by writing a value into a predetermined memory location on the device via the USB bus. This predetermined location is called a control endpoint and is normally referred to as "endpoint 0". The writing into the control endpoint is called a request.

The device responds to this request by providing information to the host that indicates what kind of device was just connected to the bus and what resources the device will require. For example, the host issues one or more different requests to the device and reads across the USB bus a requested device descriptor, a requested configuration descriptor, a requested interface descriptor, and a requested endpoint descriptor. The descriptors are data structures defined by the USB specification to be formatted to contain particular information. From information in these descriptors obtained from the device, the host determines the type of device driver needed and loads an appropriate device driver. This device driver is normally called a USB function driver. Thereafter communication occurs between the device and the driver across what are referred to as pipes. A pipe is a logical connection between an endpoint on the device and the driver in the host. The host can write to or read from an endpoint by specifying the endpoint in a four bit field in a packet sent out on the USB from the host. Due to the four bit field, there can be at most sixteen pairs of endpoints in the device. Accordingly, there can be at most 32 active pipes, 16 into the host and 16 out from the host.

USB devices are becoming ever more complex. A physical device such as a cellular telephone may actually contain a plurality of different logical USB devices. For example, the cellular telephone may appear from the host's perspective to contain a secure wireless modem, a second wireless modem that is not secure but is suitable for internet surfing, a GPS (Global Positioning System) device, and a removable storage drive. The secure wireless modem is suitable for engaging in secure networking communications. The second wireless modem is suitable for internet surfing. The GPS device sends periodic location information to the host. The storage device provides a place where the host can store information and from which the host can retrieve information. These different logical USB devices that are all embodied in the physical cellular telephone are referred to as "logical devices".

Consider one such logical device. If, for example, the logical device has information for the host to read, then the logical device interrupts the host. The USB bus, however, is a host centric bus. Only the host initiates transactions and only the host can read and/or write information across the USB bus cable. The host therefore periodically performs a read across the USB bus of an interrupt endpoint associated with the device. This is called "polling". When the device wishes to interrupt the host, the device places into the interrupt endpoint information indicating the interrupt condition. The host therefore learns of the interrupt condition by reading the interrupt endpoint (via the USB bus) during a polling operation. If the information read indicates further reads are needed, then the host responds by performing another read across the USB bus of another endpoint associated with the logical device. In the case of the logical device being the secure wireless modem, encrypted key information may be read by the host from the other endpoint associated by the secure wireless modem.

As USB devices get more and more complex and embody more and more logical devices having more and more functions, it may be that more than the available thirty-two endpoints are required to support the functions of the USB devices. One possible solution is to break the USB functions into multiple sets and to keep only one set of functions active at a time. This is possible under the USB standard. This would allow endpoints to be used for one logical device at a first time when one set of logical devices are active, and to be used for a second logical device at a second time when a second set of logical devices are active. Having logical devices disabled at certain times is, however, undesirable. The user may need to terminate current operations in order to switch to another logical device. Switching to another logical device may also trigger a new device enumeration, causing some of the user's jobs to be terminated. The result would be inefficiency and inconvenience.

A second solution is to provide another physical USB port and its associated USB functionality on the physical USB device. Each physical port and its associated functionality can support a full sixteen pairs of endpoints. This solution is costly due having to provide multiple instances of hardware. Moreover, the additional physical USB port on the physical USB device may cause confusion for users because it may not be known which logical devices are supported on which physical USB port. Moreover, USB device software may be complicated due to the need to handle multiple USB ports simultaneously.

A solution is desired.

SUMMARY

A single interrupt endpoint is shared by two different logical devices in a USB device. If a first logical device is to interrupt a USB host, then the first logical device writes an interrupt notification into an interrupt endpoint associated with the first logical device. The interrupt notification carries a number that identifies the notification to be for a first device object associated with the first logical device. If, however, a second logical device is to interrupt the USB host, then second logical device writes an interrupt notification into the interrupt endpoint associated with the first logical device, but the interrupt notification carries a number that identifies the notification to be for a second device object associated with the second logical device. In way, the second logical device does not need a dedicated interrupt endpoint to notify the host. Instead it uses the interrupt endpoint owned by the first logical device. The USB host polls the endpoint and reads the notification. The USB host uses the number and a Device ID to determine whether the notification is a notification for the first device object or the second device object. The Device ID is a number that uniquely identifies a physical USB device. If the notification is determined to be for the first device object, then the first device object processes the notification. If the notification is determined to be for the second device object, then the first device object notifies the second device object of the notification and forwards the notification to the second device object so that the second device object can process the notification. Interrupt endpoint sharing as described above can result in reduced polling by the USB host, and therefore can result in USB bus bandwidth savings and power savings.

The foregoing is a summary and thus contains, by necessity, simplifications, generalizations and omissions of detail; consequently, those skilled in the art will appreciate that the summary is illustrative only and does not purport to be limiting. Other aspects, inventive features, and advantages of the devices and/or processes described herein, as defined solely by the claims, will become apparent in the non-limiting detailed description set forth herein.

DETAILED DESCRIPTION

Figure 1:
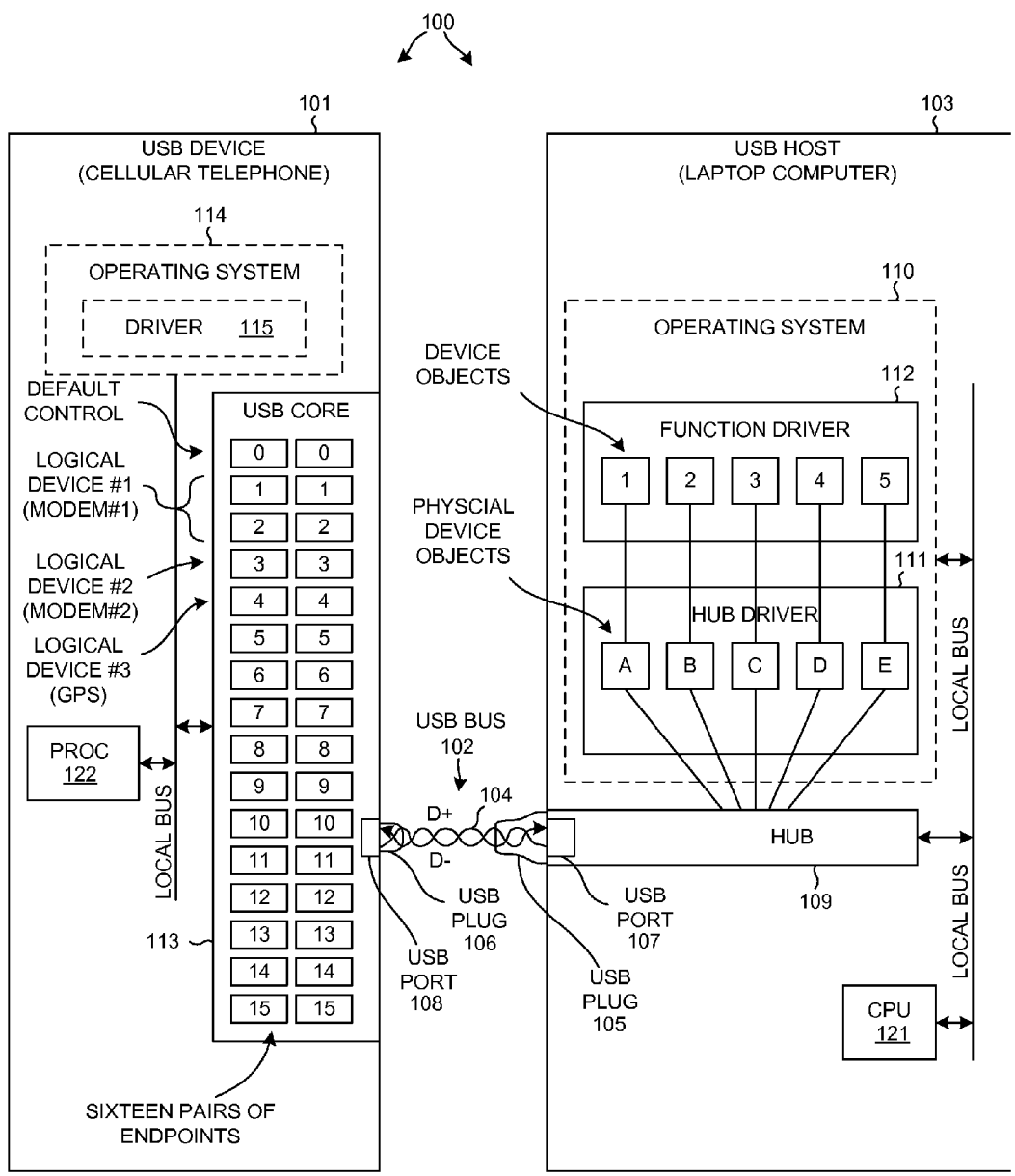
FIG. 1 is a simplified diagram of a system in accordance with one novel aspect.

FIG. 1 is a diagram of a system 100 in accordance with one novel aspect. System 100 includes a USB device 101 that is coupled by a Universal Serial Bus (USB bus) 102 to a USB host 103. In the present example, device 101 is a multi-function cellular telephone and host 103 is a laptop personal computer (PC) executing a Windows operating system. The physical connection between device 101 and host 103 involves a USB cable 104 that has a type A plug 105 at one end and a type B plug 106 at the other end. The type A plug 105 is inserted into a type A USB port 107 (also called a USB receptacle) on host 103. The type B plug 106 is inserted into a type B port 108 on device 101. USB cable 104 includes four conductors. Two of the conductors form a twisted pair of data conductors D+ and D−. This twisted pair is depicted in FIG. 1. Cable 104 also includes a supply voltage conductor and a ground conductor that are not illustrated in FIG. 1. USB bus 102 is compatible with the USB Revision 2.0 Specification available from the website (www.usb.org) of the USB Implementer's Forum, Inc (USB-IF).

Host 103 includes USB hub hardware 109, a Central Processing Unit (CPU) 121, and one or more processor-readable media (for example, semiconductor memories). CPU 121 within host 103 executes an operating system 110 of processor-executable instructions (i.e., software) that is stored in the processor-readable media. Operating system 110 includes what is sometimes referred to a USB "stack" of protocol processing layers. The USB stack includes a hub driver portion 111 and a function driver portion 112. In this example, operating system 110 is an operating system such an as operating system of Microsoft Windows family of operating systems.

Device 101 includes USB hardware that is referred to here as the "USB core" 113. A processor 122 executes an operating system 114 of processor-executable instructions (i.e., software) that is stored in one or more processor-readable media within device 101. Operating system 114 includes a driver portion 115 for interacting with and controlling USB core 113. The combination of driver 115 and USB core 113 provides sixteen operational pairs of USB endpoints. A USB endpoint is a storage location that serves as a sink or a source of information that passes from or to USB host 103. See the USB specification for further details.

The data conductors D+ and D− in cable 104 are initially pulled down by weak pulldown resistors in hub 109. When device 101 is initially coupled to host 103 via cable 104, stronger pullup resistors in core 113 pull up on the D+ and D− conductors in cable 104. Hub 109 in host 103 detects this condition. In response, host 103 engages in the standard USB enumeration process. The enumeration process involves the host 103 writing an initial value into endpoint 0 across bus 102. This value is of the form of a USB request. Device 101 responds to the USB request being present in endpoint 0 by writing information requested into a designated endpoint, typically endpoint 0. This is done by the processor of device 101 writing the information into an address of the endpoint using the local bus of device 101. The host 103 performs a read of this endpoint across the USB bus and obtains the information. In this way, host 103 obtains a device descriptor, a configuration descriptor and other requested information on what kind of device was just connected to the bus and what resources the device will require. From information obtained from device 101, operating system 110 in host 103 selects and loads an appropriate device driver. Loading here means that it obtains a binary executable code from mass storage such as hard disk, and places it into memory for execution. The result in this example is that there is one device object in driver 112 for each logical USB device.

In the example of FIG. 1, there are five logical USB devices in physical cellular telephone 101. Cellular telephone 101 is therefore called a multi-function USB device. The first logical device is denoted "logical device #1". It uses two pairs of endpoints. The first pair of endpoints is designated "1" and is used for data communication. The second pair of endpoints is designated "2". One of the endpoints of pair "2" is an interrupt endpoint and the other endpoint is not used. This first logical device has an associated physical device object "A" in hub driver 111 and also has an associated device object "1" in function driver 112. In the present example, logical device #1 is a secure wireless modem functionality that is usable to engage in secure wireless networking communications such as VPN communications to a secure server using the TCP/IP protocol.

The second logical device in physical cellular telephone 101 is denoted "logical device #2". It has one pair of endpoints. This pair of endpoints is designated "3" in FIG. 1 and is used for data communication. This second logical device has an associated physical device object "B" in hub driver 111 and also has an associated device object "2" in driver 112. In the present example, logical device #2 is a non-encrypted modem functionality that is usable to engage in internet surfing. Note that logical device #2 does not have an interrupt endpoint.

The third logical device in physical cellular telephone 101 is denoted "logical device #3". Like the second logical device, it has one pair of endpoints and does not have any interrupt endpoints. This pair of endpoints is designated "4" in FIG. 1 and is used for data communication. Logical device #3 has an associated physical device object "C" in hub driver 111 and also has an associated device object "3" in driver 112. In the present example, this logical device #3 is a GPS (Global Positioning System) device that can supply host 103 with position information that indicates the location of cellular telephone 101.

In addition to logical devices #1, #2 and #3 described above, cellular telephone 101 also includes two other logical USB devices that are not illustrated. In the example of FIG. 1, all sixteen pairs of endpoints are used by the five logical USB devices within device 101. Physical device object "D" and device object "4" are associated with the fourth logical device. Physical device object "E" and device object "5" are associated with the fifth logical device.

In one novel aspect, in addition to the usual information requested from device 101 in the enumeration process, host 103 also issues a special request to device 101. The special request has a special request code. Host 103 writes this special request into endpoint 0 across bus 102. Driver 115 of device 101 reads this special request from the address of endpoint zero using the local bus of device 101, determines from the special request code that the request is the special request, and responds by writing a "Device ID" 116 into endpoint 0 using the local bus. This "Device ID" is a device-specific value that uniquely identifies the physical device 101 and distinguishes physical device 101 from other physical devices that may be coupled to host 103 by other USB ports.

Figures 2, 3:
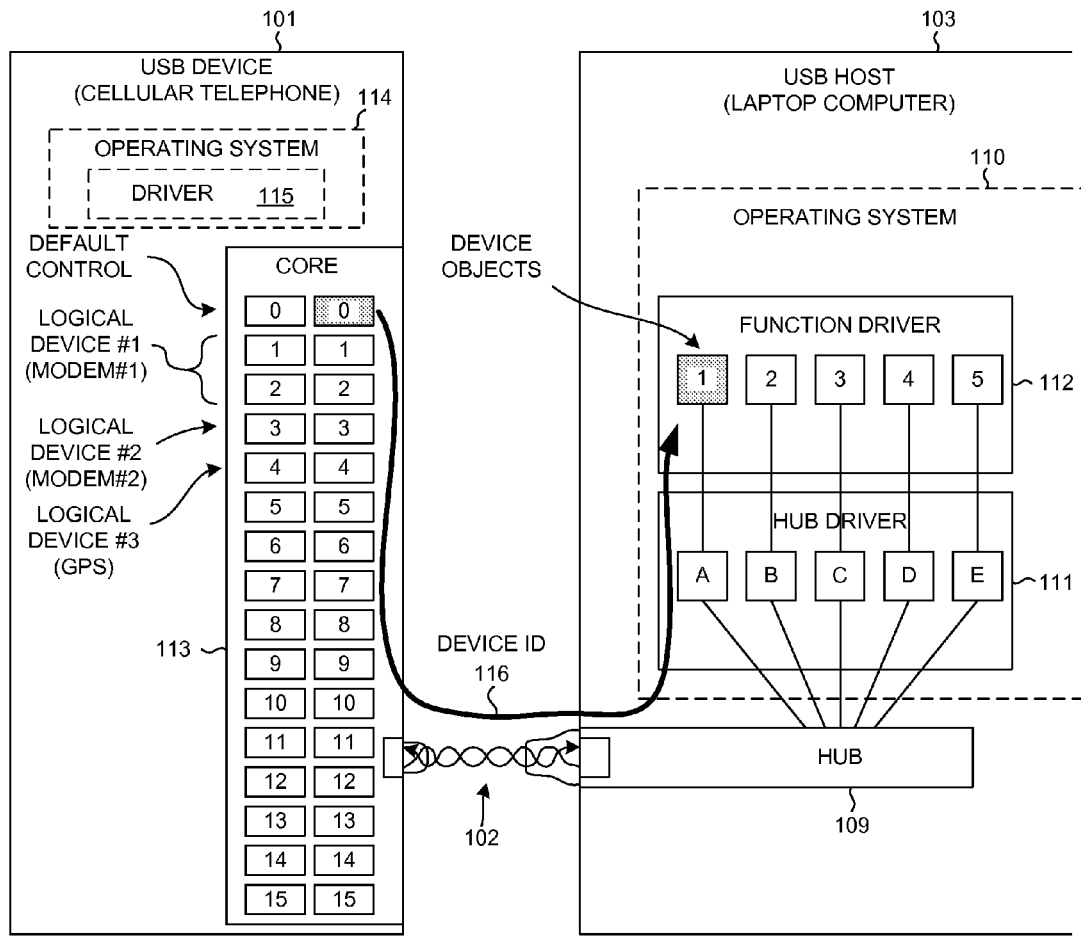
FIG. 2 is a simplified diagram that illustrates a communication of a Device ID from the USB device 101 to the USB host 103 of FIG. 1 during an enumeration process.
FIG. 3 is a diagram of a cross-reference table that is created by the function driver in the USB host of FIG. 1 using the Device ID obtained in the enumeration process.

After an adequate amount of time, host 103 reads endpoint 0 across USB bus 102. Host 103 thereby obtains Device ID 116. FIG. 2 illustrates this reading of Device ID 116 from endpoint 0 into device object "1". Device object #1 performs this operation of obtaining the Device ID and generates a cross-referencing mapping table. The cross-reference mapping table identifies, for each logical USB device, an identifying combination of an "interface number" and a "Device ID". Because host 103 can be connected to multiple physical USB devices from multiple different physical USB ports, and because each physical USB device will identify its logical devices using interface numbers starting from number one, merely specifying the interface number of the logical device may not identify the logical device. The Device ID 116 in combination with the interface number, however, does uniquely identify each logical device.

FIG. 3 is a diagram that illustrates the cross-reference mapping table. The first row of the table indicates that the interrupt endpoint for the logical device corresponding to device object "1" is identified by interface number "1" and Device ID "A". Device ID A in this case is physical USB device 101. The second row of the table indicates that the interrupt endpoint for the logical device corresponding to device object "2" is identified by interface number "3" and Device ID "A". Each device object during the initial enumeration process (after cellular telephone 101 is plugged into host 103 via USB cable 104) provides one or more entries to the table, where each entry includes device object, Device ID, and interface number or numbers associated with the logical device. Another way of considering the cross-reference information of the table of FIG. 3 is that it maps or associates a notification to a device object based on an interface number in the notification and the Device ID of the USB device from which the notification was received. When the enumeration process is complete, the Windows operating system 110 often adds the new device to the Device Manager's display in the Control Panel.

In subsequent device operation, logical device #2 may wish to send information to host 103. To do this, driver 115 on device 101 writes an interrupt notification 117 of the form illustrated in FIG. 5 into the interrupt endpoint "1". This interrupt endpoint "1" is used by logical device "1, but it is shared by logical device #2 in accordance with one novel aspect. Interrupt notification 117 is of the standard form of a data packet (as opposed to a token packet or a status packet) provided for in the USB standard, except that the contents of the DATA field 118 includes the interface number of logical device #2. In the present example, the interface number is "3". This interface number is usable to identify interrupt notification 117 as being an interrupt notification for logical device #2, even though interrupt notification 117 may be read by host 103 out of the interrupt endpoint "1" for logical device "1". The four-bit Packet ID (PID) field of interrupt notification 117 is "1011". In this example, this value in the PID indicates that the packet type is DATA1.

Figure 4:
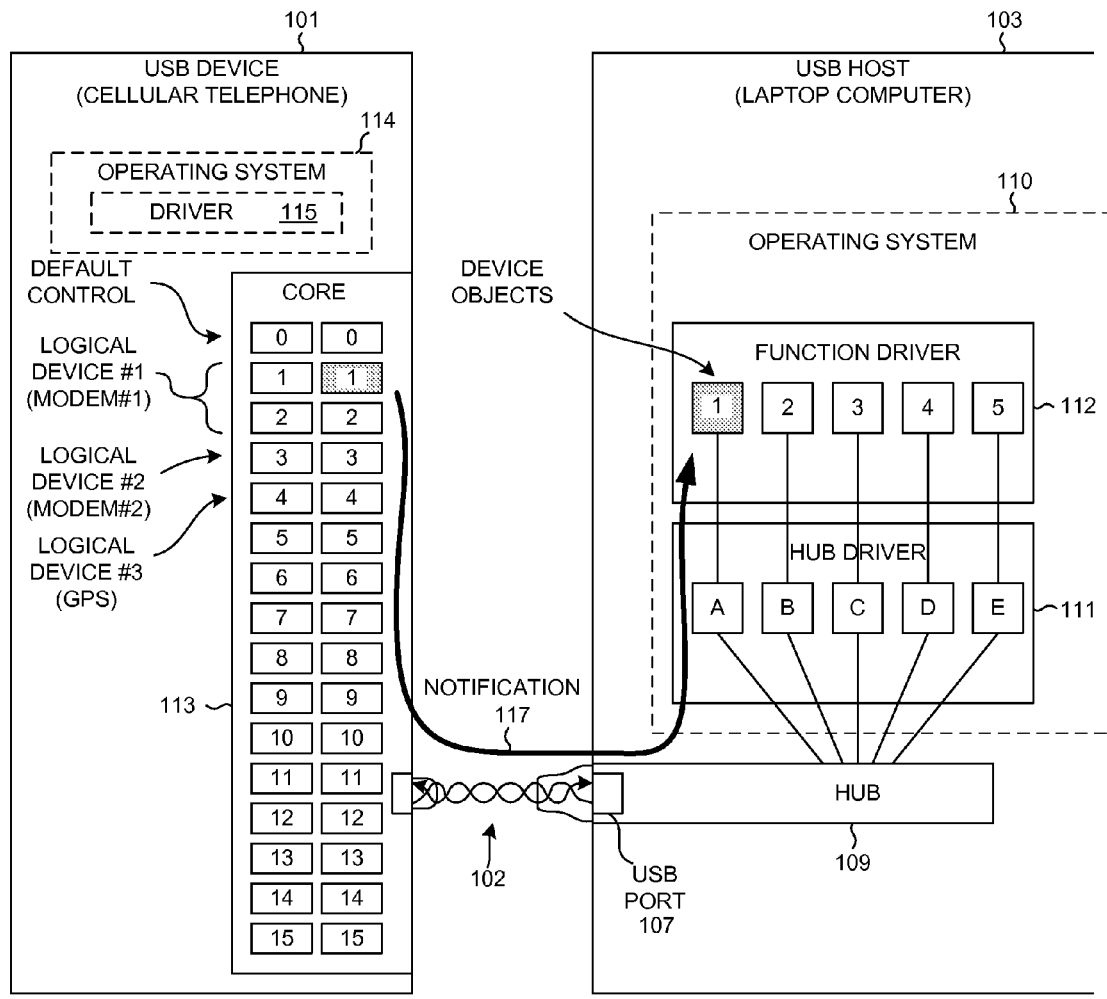
FIG. 4 is a simplified diagram that illustrates a communication of an interrupt notification from a USB endpoint in the USB device of FIG. 1 to a device object in the USB host of FIG. 1.
Figure 5:
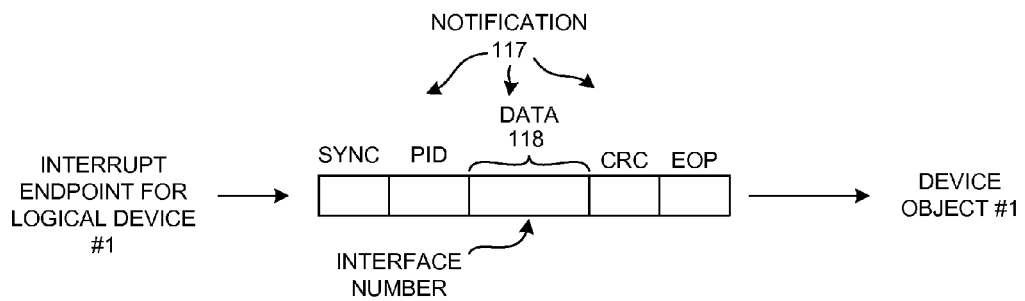
FIG. 5 is a diagram that shows the interrupt notification of FIG. 4 in more detail.

Host 103 in its normal polling operation reads interrupt endpoint "1" periodically across bus 102 in a standard USB transaction involving a token packet, a data packet, and a status packet. When host 103 reads interrupt endpoint "1", it obtains notification 117 (the data packet of the USB transaction) that has the interface number "3" of logical device "2". FIG. 4 illustrates the reading of interrupt endpoint "1" across bus 102. FIG. 5 illustrates the form of notification 117 that is transferred from interrupt endpoint "1" to device object Next, device object "1" examines the interface number carried in the DATA field 118 of notification 117. In this case, the interface number is "3". Device object "1" knows that the Device ID of the notification is "A" because device object "1" read the interrupt notification across physical port 107. Physical port 107 was associated during the enumeration process with Device ID "A". Device object "1" then consults the table of FIG. 3 to find the row of the table that includes interface number "3" and Device ID "A". This is the second row of the table. The corresponding device object in the left hand column of the table is device object 2. Device object "1" therefore determines that interrupt notification 117 is not for device object "1", but rather is for device object "2". Device object "1" then notifies device object "2" of the received notification. In one example, device object "1" notifies device object "2" of interrupt notification 117 by placing notification 117 on a notification queue 119 (see FIG. 6) of device object "2". In one embodiment, each device object has one such queue. In addition, device object "1" sets a flag bit or other indicator to indicate to device object "2" that a notification is present in its queue. Device object "2" determines that the flag bit is set, and responds by retrieving notification 117 from queue 119. Device object "2" then processes the interrupt notification. If the notification indicates that further action needs to be carried out (for example, over the data pipe (endpoint 3) or over the control pipe (endpoint 0)), then device object "2" knows to perform a read of endpoint "3" to obtain data that logical device "2 on device 101 wishes to send to host 103.

Figure 6:
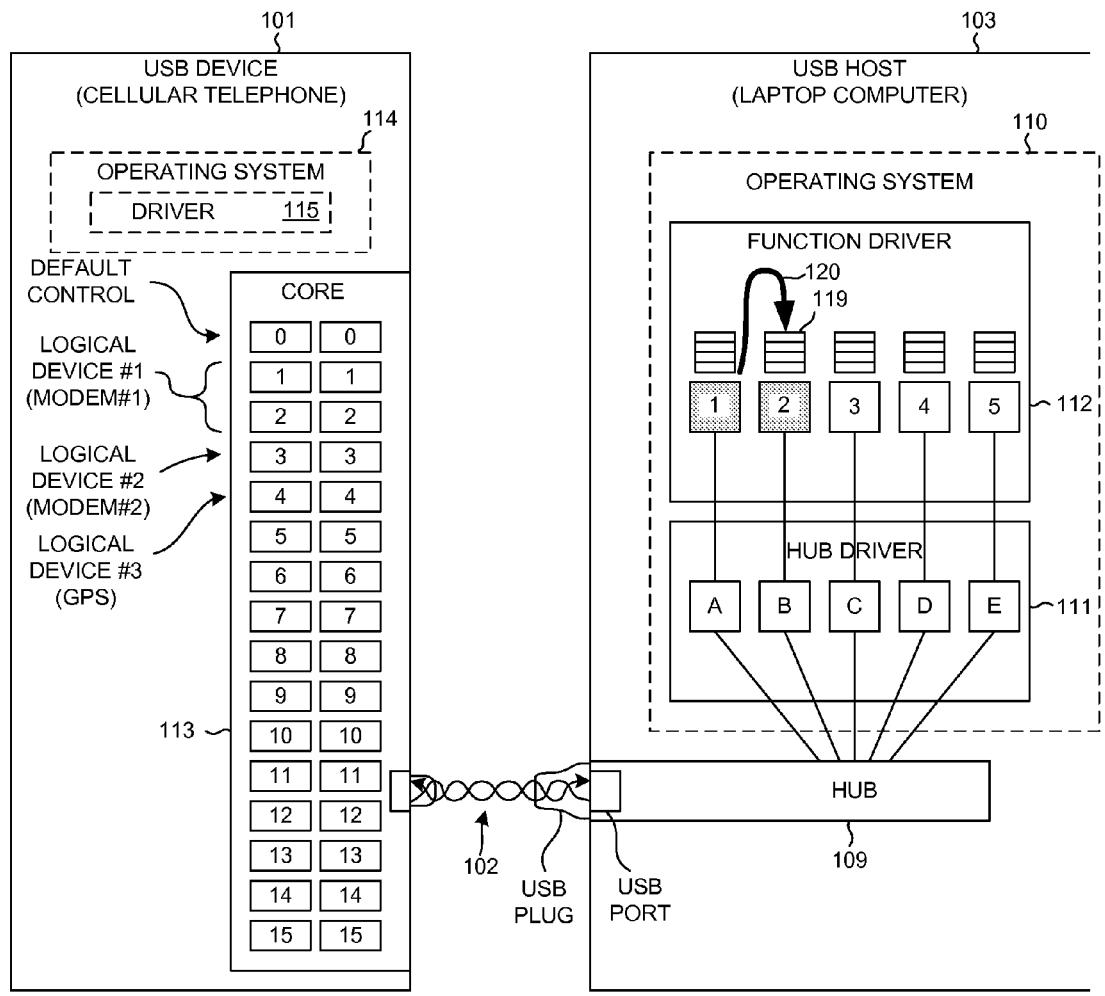
FIG. 6 is a simplified diagram that illustrates how a first device object that receives the interrupt notification of FIG. 4 examines the interface number in the data field of the interrupt notification and based at least in part on the value of this interface number determines that the notification is not intended for the first device object but rather is intended for the second device object. The first device object then notifies the second device object of the notification.

FIG. 6 illustrates device object "1" notifying device object "2" that the received interrupt notification 117 is for device object "2". The arrow 120 indicates the pushing of notification 117 into queue 119 of device object "2".

In the event that an interrupt notification for logical device "1" is to be sent to host 103, an interrupt notification of the form of FIG. 5 is placed into interrupt endpoint "1" for logical device #1. Unlike the example above, however, when the interface number is "3", the interface number here is "1" to indicate that the interrupt notification is for logical device #1. Host 103 polls the interrupt endpoint "1", reads the notification, examines the interface number, and then uses the interface number ("1" in this case) and the Device ID ("A" in this case) to consult the table of FIG. 3. Device object "1" identifies the first row of the table to be the row associated with the interrupt notification, and from the entry in the left column of the table determines that the interrupt notification is for device object "1". Device object "1" therefore processes the interrupt notification itself. If the notification indicates that further action needs to be carried out, then device object "1" knows to perform a read of endpoint "2" to obtain data that logical device "1 on device 101 wishes to send to host 103.

It is therefore seen that both logical device #1 and logical device #2 use endpoint "1" as their interrupt endpoint. They are said to "share" the endpoint. If logical device #1 wants to place an interrupt notification into endpoint "1", then it places an interrupt notification whose DATA field carries an interface number associated with logical device #1. If, on the other hand, logical device #2 wants to place an interrupt notification into endpoint "1", then it places an interrupt notification whose DATA field carries an interface number associated with logical device #2. A device object in host 103, upon receiving the interrupt notification, uses the interface number carried by the notification and a Device ID of USB device from which the notification came to determine the device object to which the notification is directed.

Figure 7:
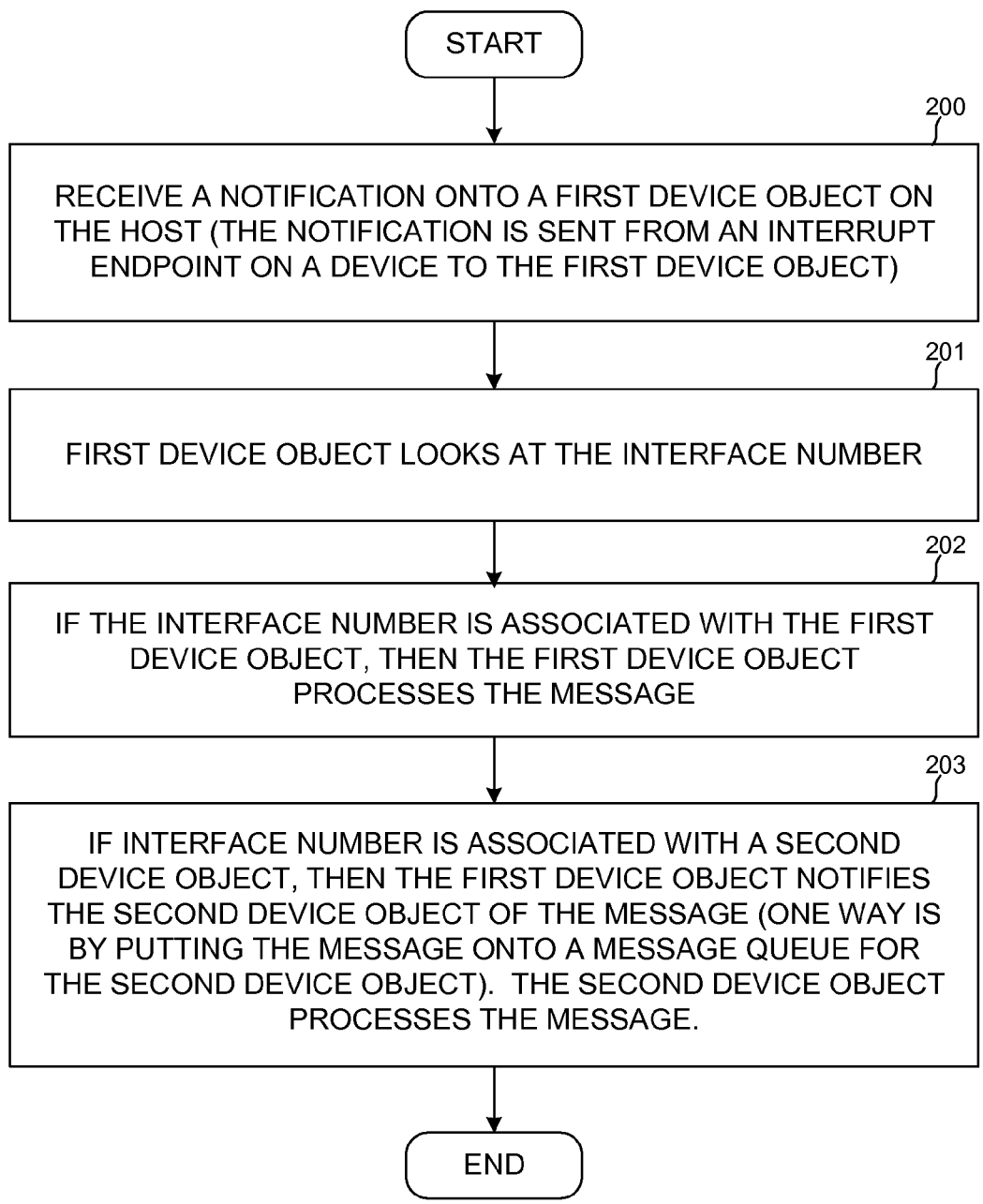
FIG. 7 is a flowchart of a method carried out in the USB host of FIG. 1.

FIG. 7 is a simplified flowchart of a method carried out by host 103 in accordance with one novel aspect. In a first step (200), an interrupt notification is received onto a USB host. The notification is sent from an interrupt endpoint on a USB device and is received onto a first device object associated with a first logical device on the USB device.

Next (step 201), the first device object on the host examines an interface number that is carried in the data field of the notification. Next (step 202), the first device object uses the interface number to determine whether the interrupt notification is for the first device object or is for another device object. In one example, the first device object uses the interface number and a Device ID of the USB device from which the notification came to consult a table of information as illustrated in FIG. 3. From the interface number and the Device ID, the first device object determines to which of the device objects on the host the interrupt notification is directed. If the first device object determines that the interrupt notification is for the first device object (step 202), then the first device object processes the interrupt notification.

If, on the other hand, the first device object determines that the interrupt notification is directed to a second device object (step 203), then the first device object notifies the second device object of the interrupt notification. In one example, the first device object notifies the second device object of the interrupt notification by placing the interrupt notification on a queue of the second device object and then setting a flag bit to indicate to the second device object that an entry is on the queue. The second device object then retrieves the interrupt notification from the queue and processes the interrupt notification. Note that the interrupt notification directed to the second device object can be supplied to the host 103 via the interrupt endpoint of the first logical device. In this way, two or more logical devices can share the same interrupt endpoint.

Figure 8:
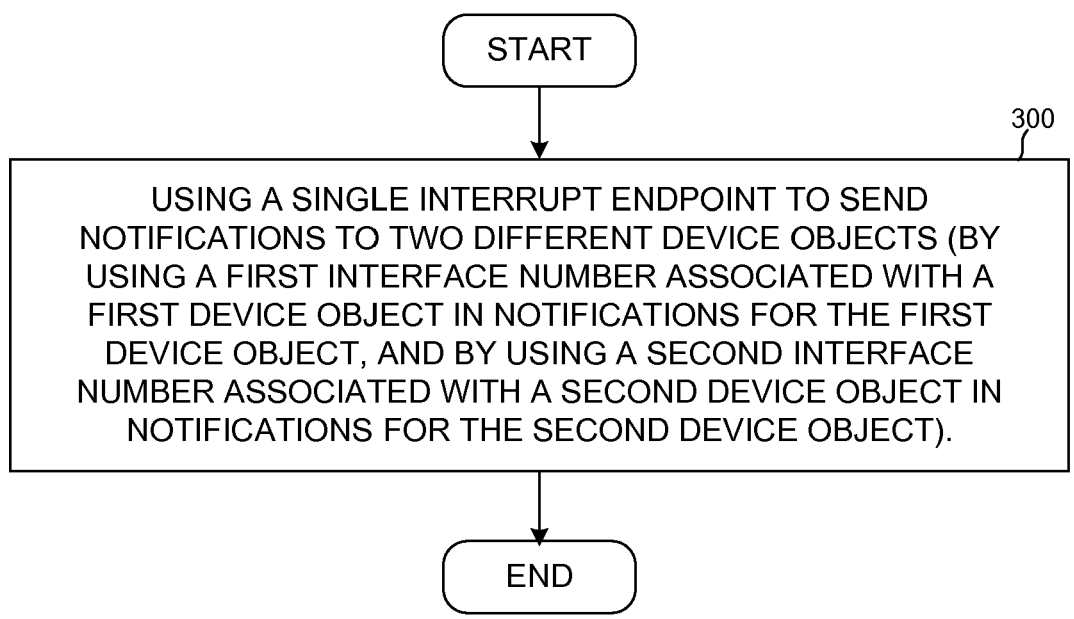
FIG. 8 is a flowchart of a method carried out in the USB device of FIG. 1.

FIG. 8 is a simplified flowchart diagram of a method carried out by USB device 101 in accordance with one novel aspect. Driver 115 in USB device 101 uses a single interrupt endpoint to send interrupt notifications to multiple different device objects (step 300) in host 103. The particular device object to which the interrupt notification is directed is identified by an interface number carried in the DATA field of the interrupt notification. The host 103 receives the interrupt notification as a result of reading the interrupt endpoint. Host 103 then uses the interface number from the interrupt notification in combination with a Device ID of the originating USB device to determine the particular device object to which the interrupt notification is directed.

Although certain specific embodiments are described above for instructional purposes, the teachings of this patent document have general applicability and are not limited to the specific embodiments described above. Although a cellular telephone is described above as an example of a USB device, the USB device can be any type of peripheral device such as, for example, an external modem, an audio player, an audio recorder, a game controller, a joystick, a digital camera, a data storage device, a printer, a scanner, a speaker, a microphone, a mouse, a keyboard, a telephone, a monitor, or another type of peripheral. A composite USB device involving multiple logical devices can employ interrupt sharing as described above for interrupt communication and can use default control pipes and associated endpoints for the communication of data. For host-to-devices transfers of data, the USB host communicates data via the default control pipe. For device-to-host transfers, the USB device notifies the USB host of incoming data using the interface number so that the USB host can initiate the receive effort with the appropriate interface. If multiple physical devices are attached to the USB host, then each physical device registers a unique Device ID with the host driver so the SUB host can correctly initiate the receive effort with the correct device. In this way, a logical device of the USB device can be supported without specifying any dedicated endpoint because interrupt sharing is used for interrupt communication and default control pipes already in use by other logical devices are used for data communication. Despite the fact that the Device ID is described above as being generated by the USB device, in other embodiments the Device ID is generated on the USB host by system software (for example, the function driver) and/or the USB hub driver. Accordingly, various modifications, adaptations, and combinations of the various features of the described specific embodiments can be practiced without departing from the scope of the claims that are set forth below.

The USB interrupt endpoint sharing techniques described herein may be implemented by various means. For example, these techniques may be implemented in hardware, firmware, software, or a combination thereof. For a hardware implementation, the processing units used to perform USB interrupt endpoint sharing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the USB interrupt endpoint sharing may be implemented with modules (e.g., procedures, functions, and so on) that perform the functions described herein. The firmware and/or software codes may be stored in a memory and executed by a processor. The memory may be implemented within the processor or external to the processor.

What is claimed is:

1. A method, comprising:
   (a) identifying a USB device associated with an interrupt endpoint;
   (b) reading a first notification from the interrupt endpoint on the identified USB device and receiving the first notification onto a first device object on a USB host, wherein the first notification contains a first number;
   (c) using the first number on the first device object to determine that the first notification is directed to the first device object;
   (d) processing the first notification on the first device object;
   (e) reading a second notification from the interrupt endpoint and receiving the second notification onto the first device object, wherein the second notification contains a second number;
   (f) using the identified USB device and second number on the first device object to determine that the second notification is directed to a second device object;
   (g) notifying the second device object of the second notification, wherein the first device object performs the notifying of (e); and
   (i) processing the second notification on the second device object.

2. The method of claim 1, wherein the first notification is a first USB interrupt message, the first USB interrupt message including a data field, wherein the first number is carried in the data field of the first interrupt message, wherein the second notification is a second USB interrupt message, the second USB interrupt message including a data field, wherein the second number is carried in the data field of the second interrupt message.

3. The method of claim 1, wherein identifying a USB device associated with an interrupt endpoint comprises:
   sending a request from the USB host to the USB device and in response to the request obtaining a device identifier from the USB device; and
   storing information in the USB host that associates a combination of the first number and the device identifier with the first device object, and that associates a combination of the second number and the device identifier with the second device object.

4. The method of claim 1, wherein steps (a) through (i) are performed by a combination of USB hardware on the USB host and an operating system executing on the USB host, wherein the USB host comprises a computer, and wherein the USB device comprises a cellular telephone.

5. A computer-program product, the computer-program product comprising a computer readable medium having instructions thereon, the instructions comprising:
   code for causing a processor to identify a USB device associated with an interrupt endpoint;
   code for causing a processor to read a first notification from the interrupt endpoint on a USB device and receiving the first notification onto a first device object on a USB host, wherein the first notification contains a first number;
   code for causing a processor to use the first number on the first device object to determine that the first notification is directed to the first device object;
   code for causing a processor to process the first notification on the first device object;
   code for causing a processor to read a second notification from the interrupt endpoint and receiving the second notification onto the first device object, wherein the second notification contains a second number;
   code for causing a processor to use the identified USB device and the second number on the first device object to determine that the second notification is directed to a second device object;
   code for causing a processor to notify the second device object of the second notification; and
   code for causing a processor to process the second notification on the second device object.

6. A method, comprising:
   (a) communicating a USB device identifier which uniquely identifies the USB device associated with a USB interrupt endpoint;
   (b) using the USB interrupt endpoint to communicate a first notification to a first device object; and
   (c) using the USB interrupt endpoint to communicate a second notification to a second device object, wherein both the first device object and a second device object are active during the communication of the first notification and during the communication of the second notification, wherein the first notification is a first USB interrupt message, the first USB interrupt message including a data field, wherein the first number is carried in the data field of the first USB interrupt message, wherein the second notification is a second USB interrupt message, the second USB interrupt message including a data field, wherein a second number us carried in the data field of the second USB interrupt message, wherein the first number and the identity of the USB device are usable to identify the first notification as being a notification for the first device object, and wherein the second number the identity of the USB device are usable to identify the second notification as being a notification for the second device object.

7. The method of claim 6, wherein the using of (b) involves a driver on a USB device writing the first notification into the USB interrupt endpoint, wherein the first device object is a first amount of code executing on a USB host, wherein the using of (c) involves the driver writing the second notification into the USB interrupt endpoint, wherein the second device object is a second amount of code executing on the USB host.

8. The method of claim 7, wherein the USB device includes a first logical device and a second logical device, wherein the first logical device is mapped by a first descriptor to a first plurality of endpoints, wherein one of the first plurality of endpoints is the USB interrupt endpoint, wherein the second logical device is mapped by a second descriptor to a second plurality of endpoints, and wherein the second descriptor does not map the second logical device to any USB interrupt endpoint.

9. The method of claim 6, wherein the first interrupt endpoint is part of a USB device, and wherein steps (a) through (c) are performed by a combination of USB hardware on the USB device and an operating system executing on the USB device.

10. A computer-program product, the computer-program product comprising a computer readable medium having instructions thereon, the instructions, comprising:
   (a) code for causing a processor to store a device identifier into an endpoint on the USB device, wherein the device identifier uniquely identifies the USB device;

(b) code for causing a processor to store a first interrupt notification for a first device object into a USB interrupt endpoint, wherein the first interrupt notification includes a first number, the first number and the USB identifier used to determine that the first interrupt notification being for a first logical device; and (c) code for causing a processor to store a second interrupt notification for a second device object into the USB interrupt endpoint, wherein both the first device object and a second device object are active during the storing of (b) and during the storing of (c), wherein the second interrupt notification includes a second number, the second number and the USB identifier used to determine that the second interrupt notification being for a second logical device.

11. A USB device comprising:

a USB endpoint;

circuitry that writes a unique identifier identifying the USB device into the USB endpoint; and circuitry that writes a first interrupt notification for a first logical device into the USB endpoint and that also writes a second interrupt notification for a second logical device into the USB endpoint, wherein both the first and second interrupt notifications are written into the USB endpoints when both the first and second logical devices are active, wherein the first interrupt notification includes a first number, the first number and the USB identifier used to determine that the first interrupt notification as being for the first logical, and wherein the second interrupt notification includes a second number, the second number and the USB identifier used to determine that the second interrupt notification as being for the second logical device.

12. The USB device of claim 11, wherein the circuitry comprises:

a processor; and a memory that stores a program of processor-executable instructions, wherein execution of the program by the processor causes the first and second interrupt notifications to be written into the USB endpoint.

13. The USB device of claim 11, wherein the USB device is a multi-function cellular telephone.

14. A system comprising:

a USB device that embodies a first logical device and a second logical device, wherein the USB device includes a USB endpoint; and a USB host coupled to the USB device by a USB bus, wherein the USB host includes a mechanism that reads an interrupt notification from the USB endpoint and based at least in part on a number carried in a data field of the interrupt notification determines whether the interrupt notification will be processed by a first driver portion associated with the first logical device or a second driver portion associated with the second logical device;

wherein the USB device communicates a unique USB device identifier and a first descriptor to the USB host that define the USB endpoint as being associated with the first logical device, and wherein the USB device communicates the unique USB device identifier and a second descriptor to the USB host that define other endpoints as being associated with the second logical device but does not define any interrupt USB endpoint as being associated with the second logical device.

15. The system of claim 14, wherein the first logical device interrupts the USB host by writing a first interrupt notification into the USB endpoint, and wherein the second logical device interrupts the USB host by writing a second interrupt notification into the USB endpoint.

16. The system of claim 14, wherein the USB device is a cellular telephone, and wherein the mechanism in the USB host comprises a central processing unit, an operating system, and a USB hub.

17. A computer-program product, the computer-program product comprising a computer readable medium having instructions thereon, the instructions, comprising:

(a) code for causing a processor to read a unique USB device identifier which identifies a USB device coupled to an interrupt endpoint;

(b) code for causing a processor to read a number carried in a USB interrupt notification, wherein the reading is performed by a first device object; and (c) code for causing a processor to use the number and unique USB device identifier to determine whether the USB interrupt notification is for the first device object or is for another device object, wherein the using of (c) is performed by the first device object, wherein the first device object and the other device object are parts of a driver.

18. A USB host device, comprising:

means for identifying a USB device associated with an interrupt endpoint;

means for reading a first notification from the interrupt endpoint on the identified USB device and receiving the first notification onto a first device object on a USB host, wherein the first notification contains a first number;

means for using the first number on the first device object to determine that the first notification is directed to the first device object;

means for processing the first notification on the first device object;

means for reading a second notification from the interrupt endpoint and receiving the second notification onto the first device object, wherein the second notification contains a second number;

means for using the identified USB device and second number on the first device object to determine that the second notification is directed to a second device object;

means for notifying the second device object of the second notification, wherein the first device object performs the notifying of (e); and means for processing the second notification on the second device object.

19. The USB host device of claim 18, wherein:

the first notification is a first USB interrupt message including a data field;, the first number is carried in the data field of the first interrupt message;

the second notification is a second USB interrupt message including a data field; and the second number is carried in the data field of the second interrupt message.

20. The USB host device of claim 18, wherein means for identifying a USB device associated with an interrupt endpoint comprises:

means for sending a request from the USB host to the USB device;

means for obtaining a device identifier from the USB device in response to the request; and means for storing information in the USB host that associates a combination of the first number and the device identifier with the first device object, and that associates a combination of the second number and the device identifier with the second device object.

21. A USB device, comprising:

means for communicating a USB device identifier which uniquely identifies the USB device associated with a USB interrupt endpoint;

means for using the USB interrupt endpoint to communicate a first notification to a first device object; and means for using the USB interrupt endpoint to communicate a second notification to a second device object, wherein:

both the first device object and the second device object are active during the communication of the first notification and during the communication of the second-notification;

the first notification is a first USB interrupt message including a data field;

a first number is carried in the data field of the first USB interrupt message;

the second notification is a second USB interrupt message including a data field;

a second number is carried in the data field of the second USB interrupt message, wherein the first number and the identity of the USB device are usable to identify the first notification as being a notification for the first device object; and the second number the identity of the USB device are usable to identify the second notification as being a notification for the second device object.

\* \* \* \* \*